United States Patent [19]
Littlefield

[11] Patent Number: 6,081,075
[45] Date of Patent: Jun. 27, 2000

[54] DC TO AC SWITCHING CIRCUIT FOR DRIVING AN ELECTROLUMINESCENT LAMP EXHIBITING CAPACTIVE LOADING CHARACTERISTICS

[75] Inventor: Troy J. Littlefield, Colorado Springs, Colo.

[73] Assignee: Toko, Inc., Japan

[21] Appl. No.: 09/311,315

[22] Filed: May 13, 1999

[51] Int. Cl.[7] .................................................. H05B 37/02
[52] U.S. Cl. ..................... 315/209 R; 315/224; 315/307; 315/DIG. 7
[58] Field of Search ................................. 315/169.3, 205, 315/224, 226, 308, DIG. 5, DIG. 7

[56] References Cited

U.S. PATENT DOCUMENTS

| | | | |
|---|---|---|---|
| 4,527,096 | 7/1985 | Kindlmann | 315/169.3 |
| 5,463,283 | 10/1995 | Sanderson | 315/209 R |
| 5,686,797 | 11/1997 | Sanderson | 315/209 R |

*Primary Examiner*—David H. Vu
*Attorney, Agent, or Firm*—William E. Hein

[57] ABSTRACT

A switching circuit is provided for converting a DC voltage to an AC voltage required for driving an electroluminescent lamp. The switching circuit charges and discharges the electroluminescent lamp with a substantially constant current to thereby reduce peak currents and extend lamp life. A constant current discharge feature of the switching circuit results in a significant reduction in current consumption.

22 Claims, 11 Drawing Sheets

6,081,075

DC TO AC SWITCHING CIRCUIT FOR DRIVING AN ELECTROLUMINESCENT LAMP EXHIBITING CAPACITIVE LOADING CHARACTERISTICS

BACKGROUND AND SUMMARY OF THE INVENTION

This invention relates generally to electroluminescent lamp drivers and, more particularly, to a DC to AC switching circuit for driving a load exhibiting capacitive characteristics.

An electroluminescent (EL) lamp is an increasingly common light emitting device utilized for providing display backlighting in many types of battery powered devices such as watches, PDAs, and cellular telephones, for example. The electrical loading characteristics of an EL lamp are substantially capacitive. To excite an EL lamp into luminescence, a relatively high voltage AC signal must be applied to the terminals thereof. Typically, the AC signal will exhibit an oscillation frequency within the range of 200–400 Hz with a peak-to-peak amplitude of 100–200 volts. To generate a high voltage AC signal from the relatively low DC voltage typically supplied by a battery, it is common to step the low battery voltage up to a relatvely high DC voltage utilizing a common boost converter. The DC voltage provided at the output of the boost converter is then converted to an AC voltage using any of a number of well known switching techniques, The H-bridge represents one such switching circuit.

Several prior art methods are known for converting a DC voltage to the AC voltage required for driving an electroluminescent lamp. Exemplary of the prior art is that described in U.S. Pat. Nos. 4,527,096 to Kindlmann and 5,463,283 to Sanderson. Kindlmann teaches a circuit for efficiently driving an EL lamp utilizing relatively few components. However, in the Kindlmann circuit, relatively large current pulses are delivered directly from an inductive element into the capacitve EL lamp. These large current spikes produce a series of small voltage steps across the EL lamp. From a reliability standpoint, these large current spikes could shorten the life of the EL lamp. The Sanderson patent discloses an alternate approach in which a common boost converter generates a relatively high voltage DC supply which is utilized to sequentially charge and discharge the EL lamp by means of a constant current through an H-bridge switching circuit. Therefore, in contrast to delivering energy through a series of large current spikes, as taught by Kindlmann, Sanderson's approach delivers energy to the EL lamp by means of a constant current, thereby extending the life of the EL lamp. Nevertheless, the Sanderson circuit is disadvantageous in that his use of current from the high voltage supply to remove charge from the capactive EL lamp will result in significantly higher power consumption when compared to the Kindlmann circuit.

It would therefore be advantageous to provide a switching circuit in accordance with the present invention for delivering energy from a high-voltage DC supply to an EL lamp utilizing a constant current flow and an improved method for discharging the capacitive EL lamp to thereby achieve significant reductions in the average current consumption from the high voltage supply.

DETAILED DESCRIPTION OF THE INVENTION

Figure 1:
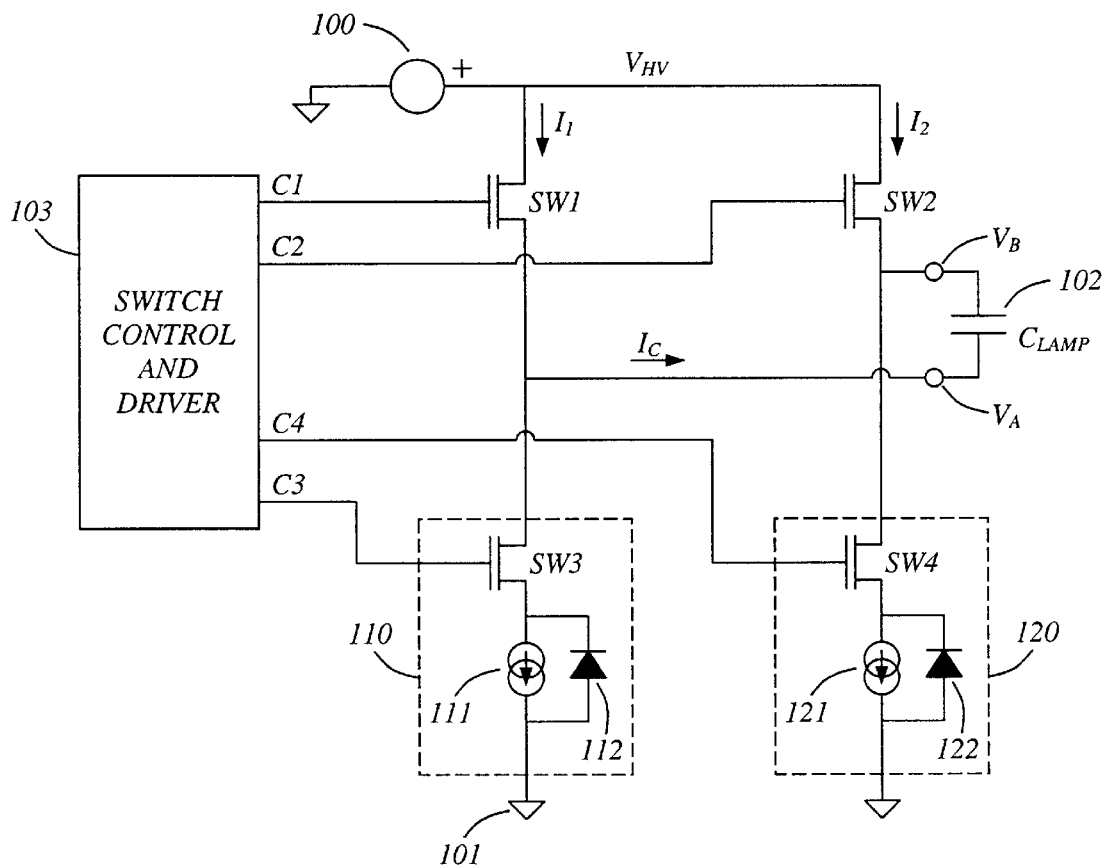
FIG. 1 is a detailed schematic diagram of a DC to AC switching circuit for driving an EL lamp, in accordance with a first embodiment of the present invention.

Referring now to FIG. 1, there is shown a schematic block diagram of a switching circuit in accordance with a first embodiment of the present invention. A voltage source 100 provides a DC voltage at input rail $V_{HV}$ relative to a DC reference 101. Output terminals $V_A$ and $V_B$ are connected to an electroluminescent lamp 102 or other substantially capacitive load. A first switch SW1 is connected between the voltage rail $V_{HV}$ and output terminal $V_A$. When a first output signal C1 is issued by a switch control and driver circuit 103, switch SW1 will be turned on, and a currrent $I_1$ will flow from the DC voltage rail $V_{HV}$ into the output terminal $V_A$. A second switch SW2 is connected between the DC voltage rail $V_{HV}$ and output terminal $V_B$. When a second output signal C2 is issued by switch control and driver circuit 103, switch SW2 will be turned on, and a current $I_2$ will flow from the DC voltage rail $V_{HV}$ into the output terminal $V_B$.

A first current conduction circuit 110, comprising a switch SW3, a current source 111, and a rectifying diode 112, is connected between output terminal $V_A$ and DC reference 101. When signal C3 is issued by switch control and driver circuit 103, a constant current corresponding to the current provided by current source 111 will flow from output terminal $V_A$ into the first current conduction circuit 110, provided that the voltage at output terminal $V_A$ is substantially higher than the DC reference 101. In this case rectifier 112 will be non-conducting. If the voltage at output terminal $V_A$ should drop to a level less than that of DC reference 101, rectifying means 112 will begin conducting current, thus reducing the current through switch SW3. Rectifier 112, together with switch SW3 further prevents the voltage at output terminal $V_A$ from dropping to a level that is significantly less than that of the DC reference 101.

A second current conduction circuit 120, comprising a switch SW4, a current source 121, and a rectifying diode 122, is connected between output terminal $V_B$ and DC reference 101. When signal C4 is issued by switch control and driver circuit 103, a constant current corresponding to the current provided by current source 121 will flow from output terminal $V_B$ into the second current conduction circuit 120, provided that the voltage at output terminal $V_B$ is substantially higher than DC reference 101. In this case rectifier 122 will be non-conducting. If the voltage at output terminal $V_B$ should drop to a level less than that of DC reference 101, rectifier 122 will begin conducting current, thus reducing the current through switch SW4. Rectifier 122, together with switch SW4, further prevents the voltage at output terminal $V_B$ from dropping to a level that is significantly less than that of the DC reference 101.

Figure 2:
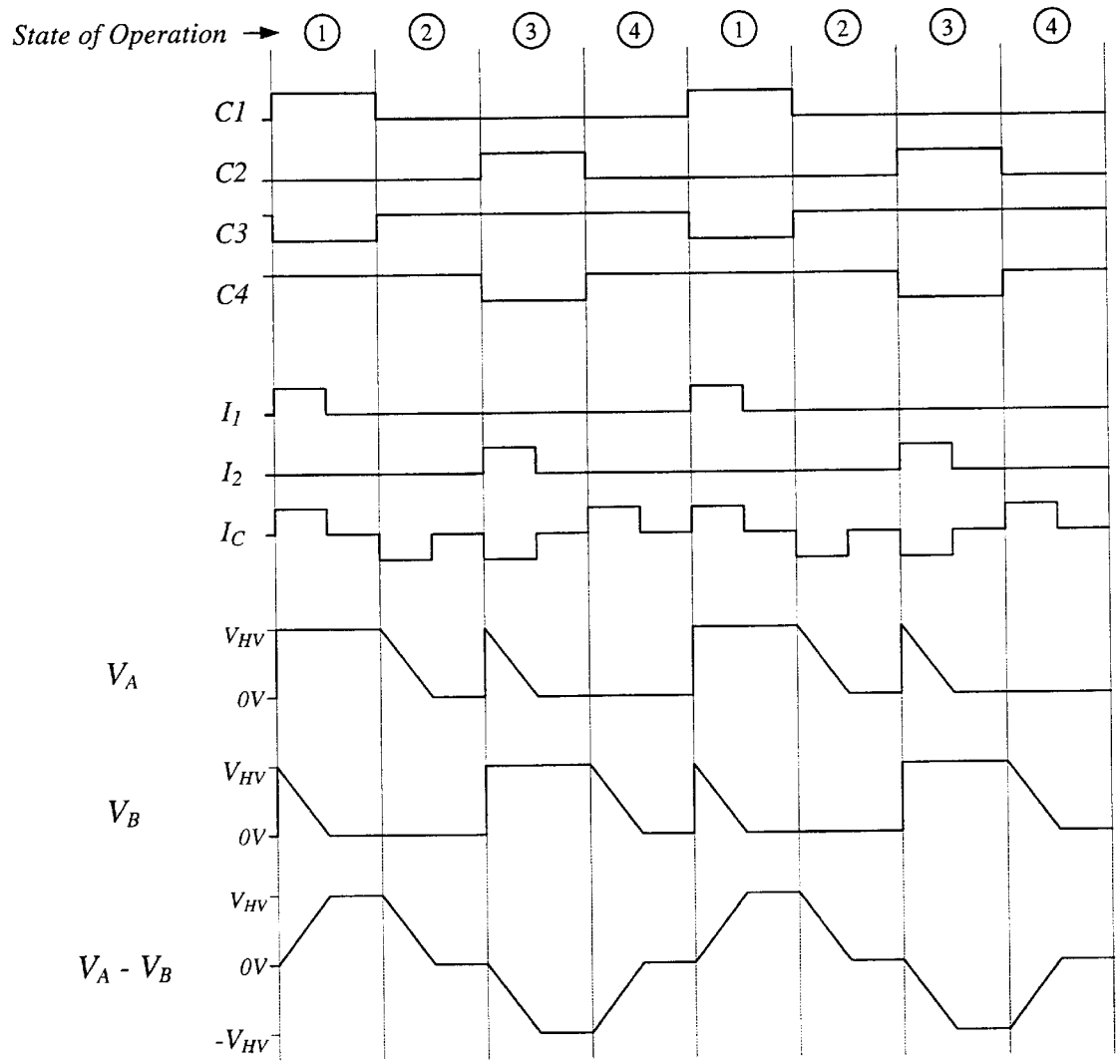
FIG. 2 is a waveform diagram illustrating typical waveforms associated with the circuit of FIG. 1.

The switch control and driver circuit 103 periodically issues output signals C1, C2, C3, and C4 synchronously with a clock which can be generated either internally or externally. Referring now to FIG. 2, there is shown a waveform diagram which exhibits the timing characteristics of signals C1, C2, C3, and C4 generated by switch control and driver circuit 103. These signals will periodically cycle switches SW1, SW2, SW3, and SW4 through four states of operation.

During the first state of operation, timing signals C1 and C4 will be issued, turning on switches SW1 and SW4, respectively. With switch SW1 on, the output terminal $V_A$ will be pulled to the potential of the input rail $V_{HV}$. With SW4 turned on, current drawn from current source 121 will flow through circuit components SW4, $C_{LAMP}$, and SW1. The current drawn from the input rail $V_{HV}$ will be equal to the current drawn from current source 121. Assuming that the charge on electroluminescent lamp 102 was initially zero, current drawn from current source 121 will cause the voltage at output terminal $V_B$ to ramp downward at a fixed rate. The voltage at output terminal $V_B$ will continue to ramp downward at a fixed rate until rectifier 122 turns on and current flow through switch SW4 ceases. When rectifier 122 turns on, the current drawn from current source 121 will flow through the rectifier 122, and the current $I_1$ flowing through circuit components SW4, $C_{LAMP}$, and SW1 will drop to zero. With the current flow through electroluminescent lamp 102 at zero, the voltage at output terminals $V_A$ and $V_B$ will remain steady. At the end of this state of operation, the voltage across the electroluminescent lamp 102 ($V_A$-$V_B$) will be substantially equal to the voltage provided by the input rail $V_{HV}$.

During the second state of operation, timing signals C3 and C4 will be issued, turning on switches SW3 and SW4, respectively. With switches SW1 and SW2 turned off, current drawn from the input rail $V_{HV}$ will be essentially zero. With switch SW3 turned on, current drawn from current source 111 will flow through circuit components SW3, $C_{LAMP}$, and rectifier 122. While current is flowing through these elements, rectifier 122 is forward biased, and the voltage at output terminal $V_B$ is slightly less than the DC reference 101. The voltage at output terminal $V_A$ will ramp downward at a rate proportional to the current provided by current source 111. When the voltage at output terminal $V_A$ falls to a potential less than the DC reference 101, rectifier 112 will turn on, and the current flow through circuit components SW3, $C_{LAMP}$, and SW4 will drop to approximately zero. At the end of this state of operation, the voltage across the electroluminescent lamp 102 ($V_A$-$V_B$) will be discharged to approximately zero voltage.

During the third state of operation, timing signals C2 and C3 will be issued, turning on switches SW2 and SW3, respectively. With switch SW2 on, the output terminal $V_B$ will be pulled to the potential of the input rail $V_{HV}$. With switch SW3 turned on, current drawn from current source 111 will flow through circuit components SW3, $C_{LAMP}$, and SW2. The current drawn from the input rail $V_{HV}$ will be equal to the current from current source 111. Assuming the charge on electroluminescent lamp 102 was initially zero, current from current source 111 will cause the voltage at output terminal $V_A$ to ramp downward at a fixed rate. The voltage at output terminal $V_A$ will continue to ramp downward at a fixed rate until rectifier 112 turns on. When rectifier 112 turns on, the current drawn from current source 111 will flow through the rectifier 112, and the current $I_2$ flowing through circuit elements SW3, $C_{LAMP}$, and SW2 will drop to zero. With the current throught the electroluminescent lamp 102 at zero, the voltage at output terminals $V_A$ and $V_B$ will remain steady. At the end of this state of operation, the voltage across the electroluminescent lamp 102 ($V_A$-$V_B$) will be substantially equal to the voltage provided by the input rail $V_{HV}$, but will be of the opposite polarity.

During the fourth state of operation, timing signals C3 and C4 will be issued, turning on switches SW3 and SW4, respectively. With switches SW1 and SW2 turned off, current drawn from the input rail $V_{HV}$ will be essentially zero. With switch SW4 turned on, current drawn from current source 121 will flow through circuit components SW4, $C_{LAMP}$, SW3, and rectifier 112. While current is flowing through these elements, rectifier 112 is forward biased, and the voltage at output terminal $V_A$ is slightly less than the DC reference 101. The voltage at output terminal $V_B$ will ramp downward at a rate proportional to the current provided by current source 121. When the voltage at output terminal $V_B$ falls to a value that is less than that of DC reference 101, rectifier 122 will turn on, and current through circuit components SW4, $C_{LAMP}$, and SW3 will drop to approximately zero. At the end of this state of operation, the voltage across the electroluminescent lamp 102 ($V_A$-$V_B$) will be discharged to approximately zero.

Implementation of the switch control and driver circuit 103 is well within the capabilities of a person having ordinary skill in the art. This circuit consists simply of a clocked state machine with four outputs, no inputs, and four states of operation. The primary design requirement of this state machine is the use of a sufficiently low clocking frequency to allow enough time for the capacitive electroluminescent lamp 102 to substantially charge and discharge. A secondary design requirement of the switch control and driver circuit 103 is to avoid a commonly known characteristic referred to as "shoot through" or "cross conduction." This phenomena occurs when current from the DC supply rail $V_{HV}$ flows directly to DC reference 101 without passing through the load (e.g. through switch pair SW1, SW3 or through switch pair SW2, SW4). Although current sources 111 and 121 limit the magnitude of the "shoot through" current, minimizing or eliminating the time period during which the aforementioned switch pairs are simultaneously conducting will reduce unnecessary losses.

The first switch SW1 of the switching circuit of FIG. 1 serves to connect the output terminal $V_A$ to input rail $V_{HV}$ during the first state of operation. During the first state, output terminal $V_A$ will remain at a voltage level substantially equal to that of the input rail $V_{HV}$. Similarly, the second switch SW2 serves to connect output terminal $V_B$ to input rail $V_{HV}$ during the third state of operation. Those skilled in the art will appreciate the multitude of possibilities that exist for the specific implementation of switches SW1 and SW2. Exemplary of such possibilities are MOSFET transistors, bipolar transistors, SCRs, etc.

The first current conduction circuit 110 of FIG. 1 serves to conduct current from output terminal $V_A$ to the DC reference 101. Similarly, the second current conduction circuit 120 serves to conduct current from output terminal $V_B$ to the DC reference 101. The manner in which current is conducted from the output terminals $V_A$ and $V_B$ is dependent upon the present state of operation and the voltage potential present at each of the output terminals. Functionally, the first current conduction circuit 110 and the second current conduction circuit 120 are identical with the exception of the operational states being two states out of phase. The following description further delineates the behavior of the first conduction circuit 110 in each of the four operational states. During the first state of operation, switch SW1 is on, and the voltage at output terminal $V_A$ is substantially equal to that of the input rail $V_{HV}$. With output terminal $V_A$ connected to input rail $V_{HV}$, first current conduction circuit 110 should act as an open circuit throughout the first state of operation. Thus, current flowing into first current conduction circuit 110 will be substantially equal to zero throughout the first state of operation. During the second state of operation, when switches SW3 and SW4 are on, first current conduction circuit 110 serves to conduct a substantially constant current from output terminal $V_A$. While output terminal $V_A$ remains substantially greater than DC reference 101, first current conduction circuit 110 will continue to draw a substantially constant current from output terminal $V_A$. When the voltage of output terminal $V_A$ drops to a value slightly below that of DC reference 101, rectifier 112 will begin to conduct, and current flow from output terminal $V_A$ will drop to a value substantially equal to zero. During a third state of operation, switch SW2 is on, and the voltage at output terminal $V_B$ is substantially equal to that of the input rail $V_{HV}$. Similar to the second state of operation, first current conduction circuit 110 serves to conduct a substantially constant current from the output terminal $V_A$ during the third state of operation. While the voltage at output terminal $V_A$ remains substantially greater than that of the DC reference 101, the first current conduction circuit 110 will continue to draw a substantially constant current from output terminal $V_A$. When the voltage at output terminal $V_A$ drops to a value slightly below that of DC reference 101, rectifier 112 will begin to conduct, and current flow from output terminal $V_A$ will drop to a value substantially equal to zero. During a fourth state of operation, when switches SW3 and SW4 are on, current conduction circuit 120 will be pulling down on output terminal $V_B$ with a substantially constant current. Under such conditions, rectifier 112 serves to prevent the voltage at output terminal $V_A$ from dropping to a level that is substantially less than that of DC reference 101. Therefore, during the fourth state of operation, current conduction circuit 110 serves as a rectifier to maintain the voltage at output terminal $V_A$ substantially equal to that of DC reference 101.

Figure 3A:
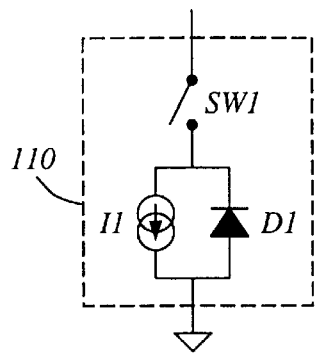
FIG. 3A is a schematic diagram illustrating a first embodiment of the current conduction portion of the circuit of FIG. 1.
Figure 3B:
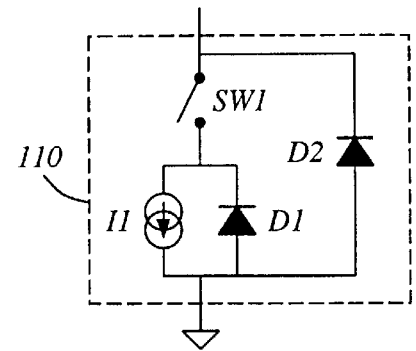
FIG. 3B is a schematic diagram illustrating a second embodiment of the current conduction portion of the circuit of FIG. 1.
Figure 3C:
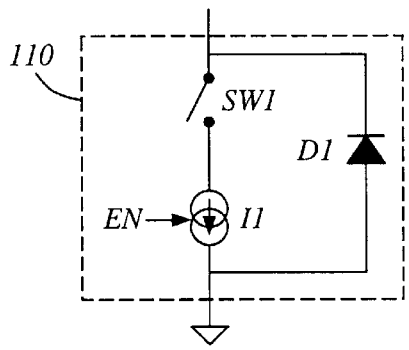
FIG. 3C is a schematic diagram illustrating a third embodiment of the current conduction portion of the circuit of FIG. 1.
Figure 3D:
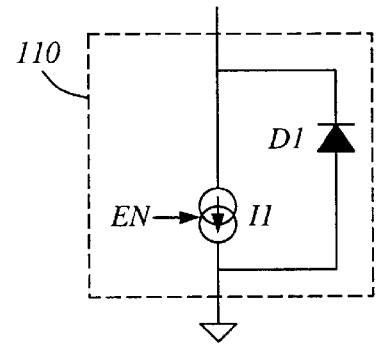
FIG. 3D is a schematic diagram illustrating a fourth embodiment of the current conduction portion of the circuit of FIG. 1.
Figure 3E:
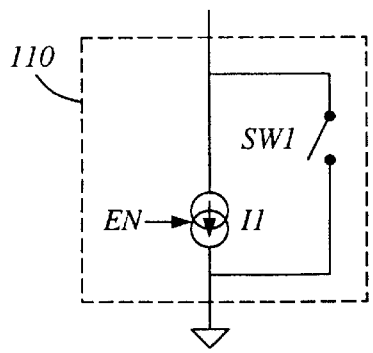
FIG. 3E is a schematic diagram illustrating a fifth embodiment of the current conduction portion of the circuit of FIG. 1.

Although one embodiment of the first and second current conduction circuits 110 and 120 has been illustrated in FIG. 1, it will be appreciated by those skilled in the art that other embodiments are possible. FIGS. 3A–E illustrate some of those other embodiments. For example, FIG. 3A illustrates a switch SW1, a current source 11, and a passive rectifier D1, as employed in the first embodiment of the present switching circuit. FIG. 3B illustrates a switch SW1, a current source 11, a first passive rectifier D1, and a second rectifier D2. In this embodiment of current conduction circuit 110, switch SW1 is closed during the second and third states of operation. FIG. 3C illustrates a switch SW1, a current source 11 with a corresponding enable signal EN, and a passive rectifier D1. In this embodiment, switch SW1 is closed, and current source 11 is enabled during the second and third states of operation. During the first and fourth states of operation switch SW1 is open, and current source 11 is disabled. FIG. 3D illustrates a current source 11, a corresponding enable signal EN, and a passive rectifier D1. In this embodiment, current source 11 is enabled during the second and third states of operation. FIG. 3E illustrates a current source 11, a corresponding enable signal EN, and a switch SW1 that serves as an active rectifier. In this embodiment, current source 11 is enabled during the second and third states of operation. If the voltage across current source 11 is substantially zero, current source 11 is disabled, and synchronous switch SW1 is turned on. In the fourth state of operation, current source 11 is disabled, and switch SW2 is open. Although several specific embodiments of first and second current conduction circuits 110 and 120 have been described and shown, a multitude of other possibilities exist which exhibit the same functional characteristics as those illustrated. Furthermore, although the embodiments of the first and second current conduction circuits of FIGS. 3A–3E have been illustrated with constant current sources, resulting in a ramp waveform across capacitive load 102, those persons skilled in the art could readily replace the constant current sources with variable current sources to generate alternative waveform shapes across the capacitive load 102.

The embodiment of the present switching circuit illustrated in FIG. 1, when compared to a previously mentioned prior art circuit, achieves a reduction in average supply current of approximately 50%. Furthermore, this embodiment exhibits the advantageous characteristic of constant current delivery to the electroluminescent lamp 102. Such an approach will extend the life of lamp 102, while minimizing power dissipation. The primary disadvantage of the switching circuit of FIG. 1 is the significant amount of delay time between the discharging and charging of electroluminescent lamp 102. This delay time will introduce a "flat spot" in the rising and falling waveforms of voltage across the electroluminescent lamp 102.

Figure 4:
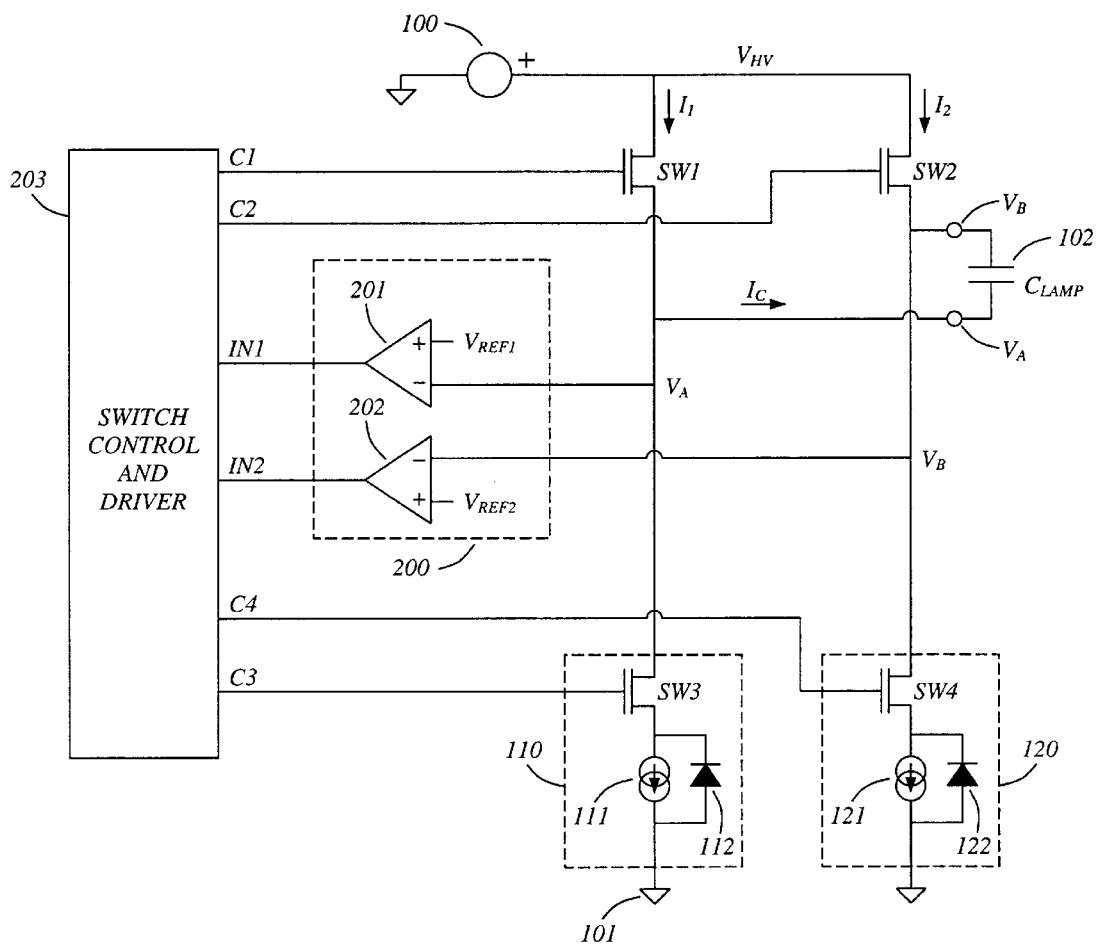
FIG. 4 is a detailed schematic diagram of a DC to AC switching circuit for driving an EL lamp, in accordance with a second embodiment of the present invention.

Referring now to FIG. 4, there is shown a schematic block diagram of a switching circuit in accordance with a second emodiment of the present invention which serves to eliminate the "flat spot" characteristic exhibited by the switching circuit of FIG. 1. The operation of the circuit of FIG. 4 is identical to that of the circuit of FIG. 1, with the exception of control signal timing. In the circuit of FIG. 1, the control signals C1, C2, C3, and C4 are generated by the switch control and driver circuit 103 independent of any inputs. In the circuit of FIG. 4, a modified switch control and driver circuit 203 generates output signals C1, C2, C3, and C4 in response to input signals IN1 and IN2. The first input signal IN1 serves to initiate a transition between the second and third states of operation. The second input signal IN2 serves to initiate a transition between the fourth and first states of operation. As an alternative approach, a single input may be utilized for initiating both the second-to-third state transition and the fourth-to-first state transition. The remaining state transitions are initiated in response to a clock, independent of the input signals, in a manner similar to the way those state transitions are initiated in the switching circuit of FIG. 1.

A sense and compare circuit 200 of FIG. 4 serves to monitor the voltages at the first and second output terminals $V_A$ and $V_B$ to generate two output signals connected to the IN1 and IN2 inputs, respectively, of switch control and driver circuit 203. Comparator 201 serves to monitor the voltage at the first output terminal $V_A$. At the initiation of the second state of operation, the voltage at output terminal $V_A$ is relatively high. Throughout the second state of operation, the voltage at the output terminal $V_A$ decreases at a fixed rate toward zero. When the voltage at the output terminal $V_A$ passes through a first reference voltage $V_{REF1}$ that is typically near zero, comparator 201 will issue signal IN1. In response to the issuance of signal IN1, switch control and driver circuit 203 will terminate the second state of operation and initiate the third state of operation. Comparator 202 serves to monitor the voltage at the second output terminal $V_B$. At the initiation of the fourth state of operation, the voltage at output terminal $V_B$ is relatively high. Throughout the fourth state of operation, the voltage at the output terminal $V_B$ will decrease at a fixed rate toward zero. When the voltage at the output terminal $V_B$ passes through a second reference voltage $V_{REF2}$ that is also typically near zero, comparator 202 will issue signal IN2. In response to the issuance of signal IN2, switch control and driver circuit 203 will terminate the fourth state of operation and initiate the first state of operation.

As in the case of the switching circuit of FIG. 1, implementation of switch control and driver circuit 203 is well within the capabilities of those persons having ordinary skill in the art. Switch control and driver circuit 203 simply consists of a clocked state machine having four outputs, two inputs, and four states of operation. The transition from the first state to the second state and the transition from the third state to the fourth state is initiated in response to a clock. The transition from the second state to the third state and the transition from the fourth state to the first state is initiated in response to the two input signals. As in the case of the switching circuit of FIG. 1, some design precautions should be taken during state transitions to avoid the commonly known "shoot through" or "cross conduction" phenomena.

Figure 5:
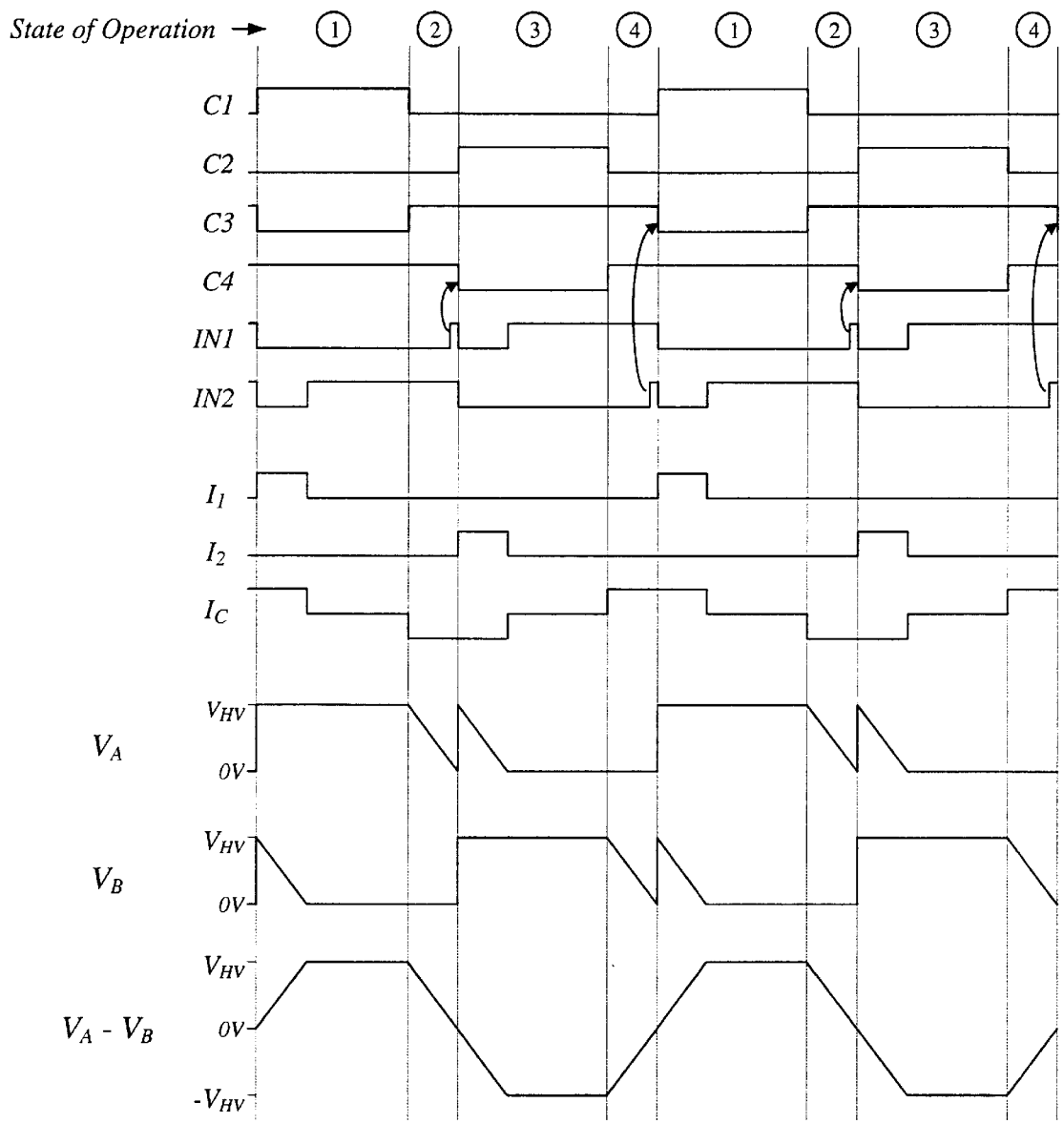
FIG. 5 is a waveform diagram illustrating typical waveforms associated with the circuit of FIG. 4.

Referring now to FIG. 5, there is shown a waveform diagram illustrating the timing characteristics of signals C1, C2, C3, and C4 generated by the switch control and driver circuit 203. This waveform diagram differs from that of FIG. 2 in the duration of the second and fourth states of operation. The switching circuit of FIG. 4 transitions from the second to the third state and from the fourth to the first state immediately following the discharge of the capacitive load 102. This immediate transition from one state to another serves to eliminate the "flat spot" characteristics of the switching circuit of FIG. 1.

Figure 6:
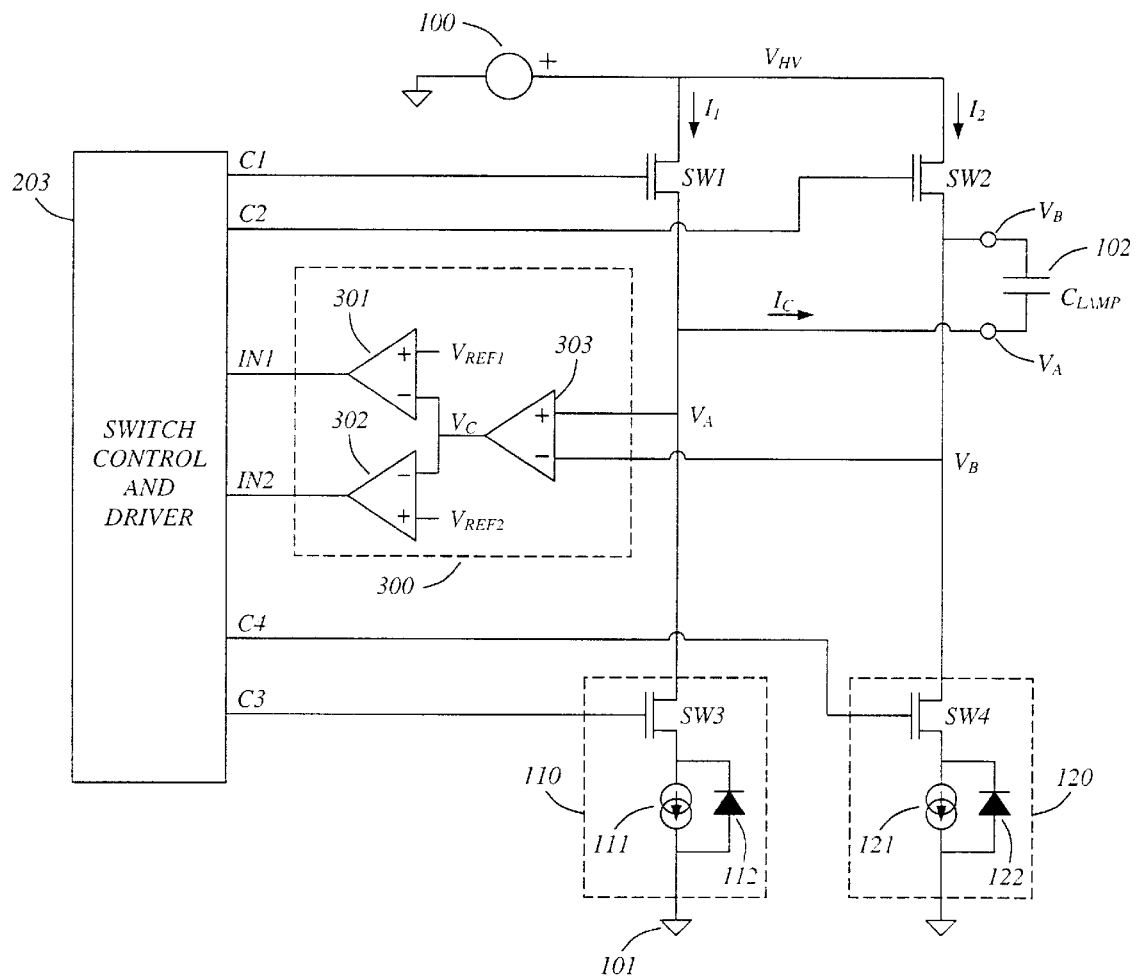
FIG. 6 is a detailed schematic diagram of a DC to AC switching circuit for driving an EL lamp, in accordance with a third embodiment of the present invention.

In the embodiment of the invention illustrated in FIG. 4, sense and compare circuit 200 serves to individually monitor output terminals $V_A$ and $V_B$. Referring now to FIG. 6, there is shown a third embodiment of the present invention in which the sense and compare circuit 200 of FIG. 4 has been replaced with a modified sense and compare circuit 300 which utilizes differential voltage sensing means. A differential amplifier 303 serves to monitor the differential voltage between output terminals $V_A$ and $V_B$ to generate a sense voltage $V_C$. Sense voltage $V_C$ is compared to a first reference voltage $V_{REF1}$ utilizing a first comparator 301 to generate input signal IN1 to the switch control and driver circuit 203. Similarly, a second comparator 302 is utilized to generate input signal IN2 by comparing sense voltage $V_C$ to a second reference voltage $V_{REF2}$. Typically, the first reference voltage $V_{REF1}$ and the second reference voltage $V_{REF2}$ will have values close to zero. In such an arrangement, output signals IN1 and IN2 will be issued as the differential voltage across the output terminals $V_A$ and $V_B$ approaches zero.

Figure 7:
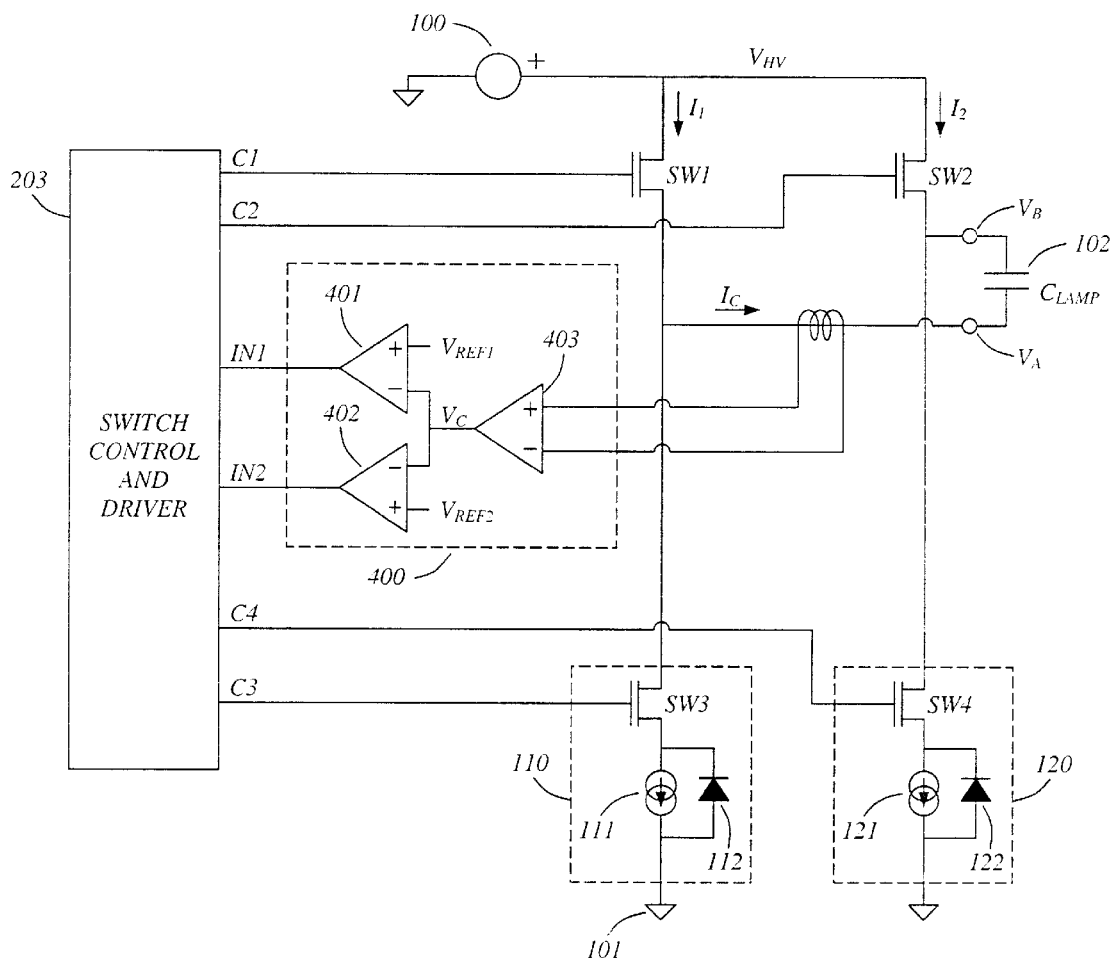
FIG. 7 is a detailed schematic diagram of a DC to AC switching circuit for driving an EL lamp, in accordance with a fourth embodiment of the present invention.

In the embodiment of FIG. 6, sense and compare circuit 300 serves to differentially monitor the voltage between output terminals $V_A$ and $V_B$ to generate input signals IN1 and IN2. Referring now to FIG. 7, there is shown a fourth embodiment of the present invention in which the sense and compare circuit 300 of FIG. 6 has been replaced with a modified sense and compare circuit 400 which utilizes a current sensing means. An amplifier 403 provides a current sensing function for monitoring current $I_C$ to generate a proportional sense voltage $V_C$. Many well known techniques exist in the prior art for sensing a current and generating a proportional voltage. Exemplary of such techniques are the current sense resistor and the current sense coil. Sense voltage $V_C$ is compared to a first reference voltage $V_{REF1}$ utilizing a first comparator 401 to generate input signal IN1 to the switch control and driver 203. Similarly, a second comparator 402 is utilized to generate input signal IN2 by comparing sense voltage $V_C$ to a second reference voltage $V_{REF2}$. As mentioned in the foregoing descriptions of previous embodiments of the present invention, as the voltage across capacitive load 102 discharges toward zero, current flow through current conduction circuits 110 and 120 is also reduced toward zero. Therefore, voltage references $V_{REF1}$ and $V_{REF2}$ are typically set to a value near zero to correspondingly detect zero current through the load 102. Although the diagram of FIG. 7 illustrates sense and compare circuit 400 monitoring current $I_C$ through the capacitive load 102, sense and compare circuit 400 could alternatively monitor the current flow through current conduction circuits 110 and 120 while still providing proper operation of the circuit of the present invention.

Figure 8:
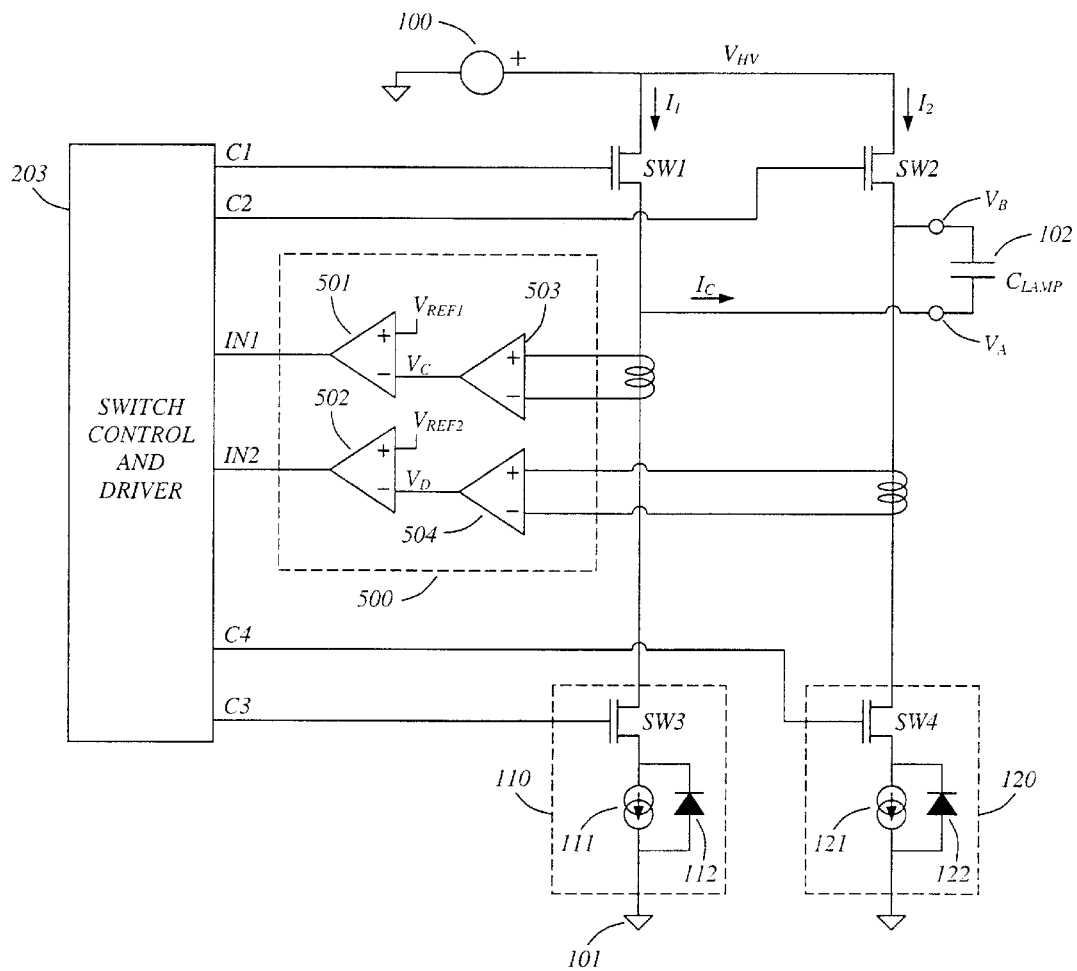
FIG. 8 is a detailed schematic diagram of a DC to AC switching circuit for driving an EL lamp, in accordance with a fifth embodiment of the present invention.

In the previously described fourth embodiment of the present invention, sense and compare circuit 400 serves to monitor the current flow through capactive load 102 to generate input signals IN1 and IN2. Referring now to FIG. 8, there is shown a fifth embodiment of the present invention which utilizes an alternative sense and compare circuit 500 employing a pair of current sensing amplifiers. Amplifier 503 provides a current sensing function for monitoring current flowing into current conduction circuit 110 to generate a first sense voltage $V_C$. Sense voltage $V_C$ is compared to a first voltage reference $V_{REF1}$ by comparator 501 to generate control signal IN1. Similarly, amplifier 504 provides current sensing function for monitoring current flowing into current conduction circuit 120 to generate a second sense voltage $V_D$. Sense voltage $V_D$ is compared to a second voltage reference $V_{REF2}$ by comparator 502 to generate control signal IN2. As with the previously described fourth embodiment, voltage references $V_{REF1}$ and $V_{REF2}$ are typically set to a value near zero corresponding to approximately zero current through either of current conduction circuits 110 and 120. Although the embodiment of FIG. 8 is illustrated with the outputs of comparator 501 and comparator 502 connected to the respective IN1 and IN2 inputs of switch control and driver circuit 203, the output of comparator 501 could alternatively drive the IN2 input with comparator 502 driving the IN1 input. Such a modification, together with corresponding adjustments in the voltage references $V_{REF1}$ and $V_{REF2}$ would still provide proper operation.

Figure 9:
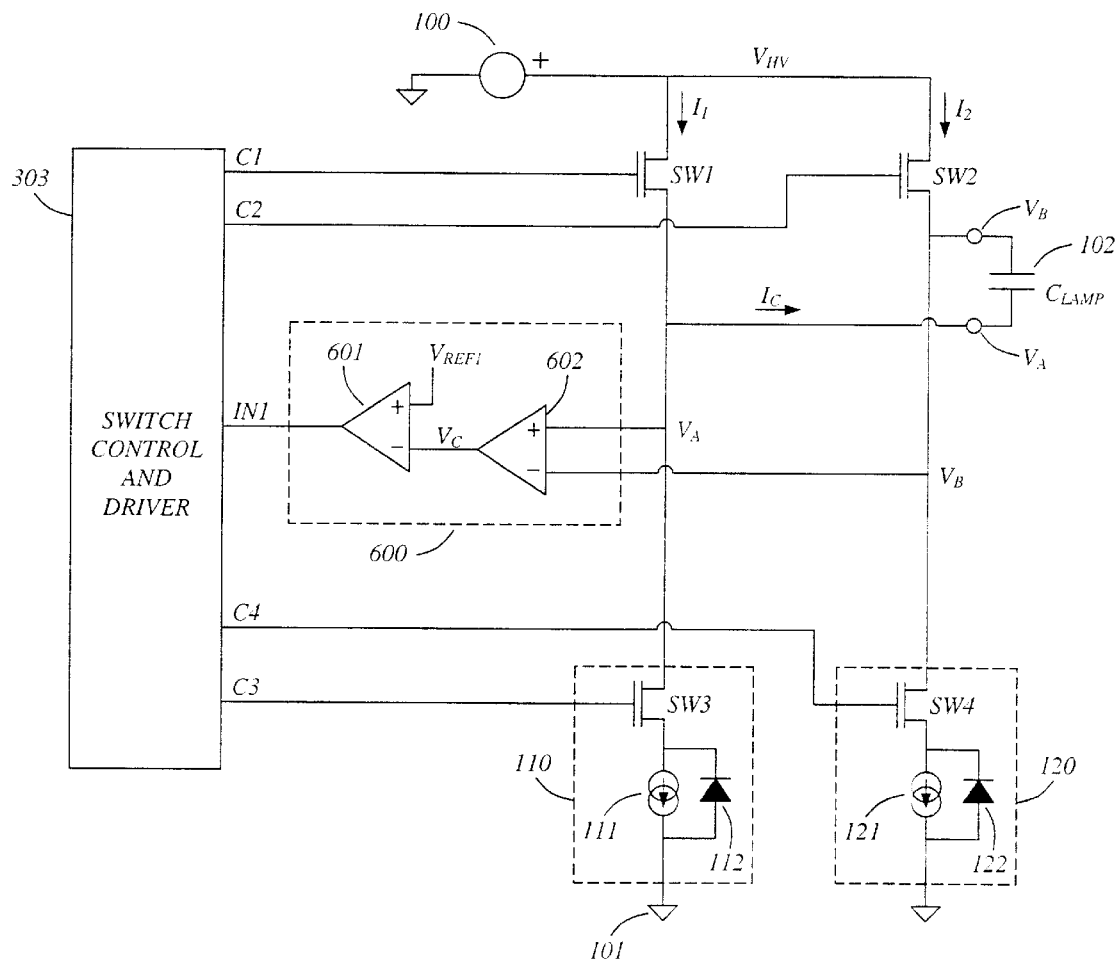
FIG. 9 is a detailed schematic diagram of a DC to AC switching circuit for driving an EL lamp, in accordance with a sixth embodiment of the present invention.

Referring now to FIG. 9, there is shown a schematic block diagram in accordance with a sixth embodiment of the present invention. In each of the previously described second, third, fourth, and fifth embodiments, switch control and driver circuit 203 initiates state transitions in response to two input signals IN1 and IN2. The embodiment of FIG. 9 utilizes a modified switch control and driver circuit 303 which initiates state transitions in response to a single input IN1. As with previous embodiments, the transition between the first and second states of operation and the transition between the third and fourth states of operation are initiated in response to a clock signal. Switch control and driver circuit 303 further initiates the transition between the second and third states of operation and between the fourth and first states of operation, in response to the single input IN1. Sense and compare circuit 600 serves to monitor the differential voltage between output terminals $V_A$ and $V_B$ and generate a single output signal IN1 connected to the input of switch control and driver circuit 303. An amplifier 602 monitors the differential voltage between output terminals $V_A$ and $V_B$ and generates an output voltage $V_C$. Output voltage $V_C$ is compared to a voltage reference $V_{REF1}$ by a comparator 601. The output of comparator 601 corresponds to the output of the sense and compare circuit 600. The output of sense and compare circuit 600 is connected to the input of switch control and driver circuit 303. As with previous embodiments, voltage reference $V_{REF1}$ is typically near zero, corresponding to signal IN1 being issued as the differential voltage $V_A$-$V_B$ passes through zero. The signal IN1 is thus being utilized for initiating the aforementioned state transitions.

Figure 10:
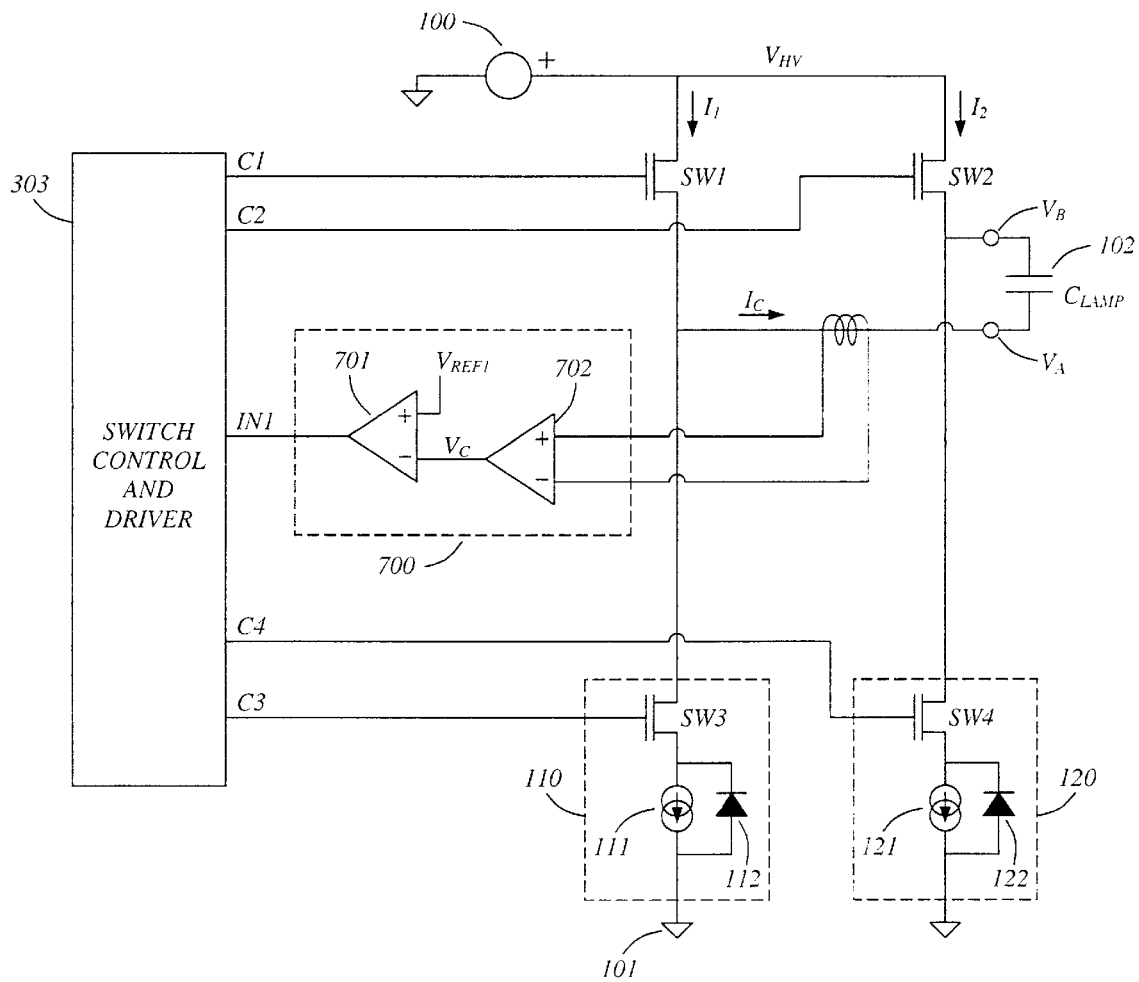
FIG. 10 is a detailed schematic diagram of a DC to AC switching circuit for driving an EL lamp, in accordance with a seventh embodiment of the present invention.

In the previously described sixth embodiment of the present invention, sense and compare circuit 600 serves to monitor the differential voltage between output terminals $V_A$ and $V_B$ to generate a single input signal IN1 to switch control and driver circuit 303. Referring now to FIG. 10, there is shown a seventh embodiment of the present invention wherein said sense and compare circuit 600 has been replaced with a modified sense and compare circuit 700 which utilizes current sensing to generate a single output signal. Amplifier 702 provides current sensing for monitoring current $I_C$ to generate a proportional sense voltage $V_C$. Sense voltage $V_C$ is compared to reference voltage $V_{REF1}$ utilizing comparator 701 to generate input signal IN1 to switch control and driver circuit 303. As mentioned hereinabove in the description of previous embodiments of the present invention, as the voltage across capacitive load 102 discharges toward zero, current flow through current conduction circuits 110 and 120 also decreases toward zero. Therefore, voltage reference $V_{REF1}$ is typically set to a value near zero to correspondingly detect zero current through the load. Although the diagram of FIG. 10 illustrates sense and compare circuit 700 monitoring current $I_C$ through the capacitive load 102, sense and compare circuit 700 could alternatively monitor the current flow through current conduction circuit 110 or current conduction circuit 120 while still providing proper operation of the present invention.

The previously described embodiments utilize a voltage source 100 to generate the voltage on the DC input rail $V_{HV}$. Those skilled in the art will readily recognize that the voltage source 100 in the previously described seven embodiments of the present invention can be easily replaced with an alternative DC voltage source, such as a DC-to-DC converter, for example.

Figure 11:
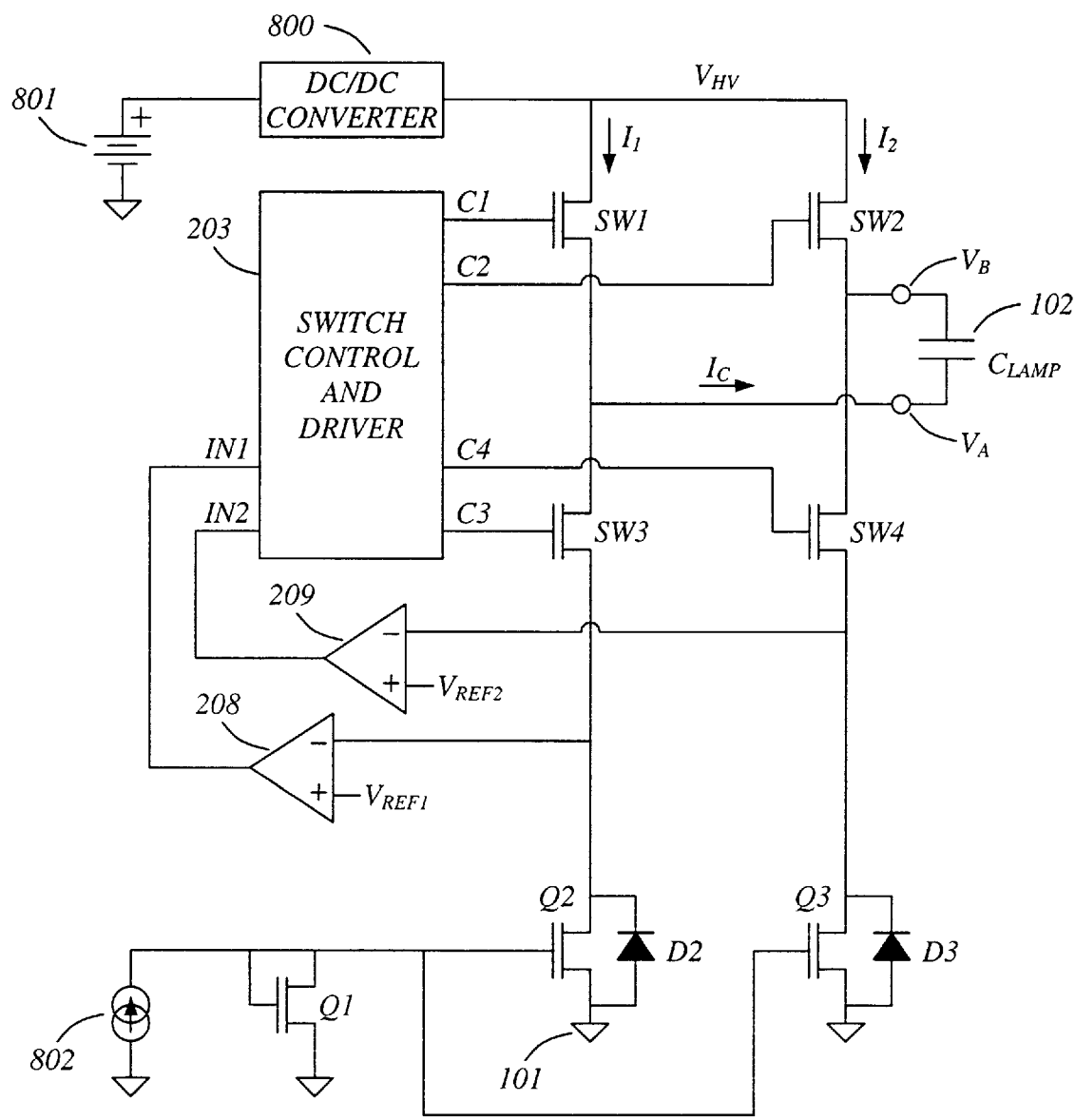
FIG. 11 is a detailed schematic diagram of a DC to AC switching circuit for driving an EL lamp, in accordance with an eighth embodiment of the present invention.

Referring now to FIG. 11, there is shown a schematic block diagram in accordance with an eighth embodiment of the present invention. A DC-to-DC converter 800 steps up a relatively small voltage source 801, such as a battery, to the higher voltage required at the input supply rail $V_{HV}$. A first output terminal $V_A$ and a second output terminal $V_B$ are connected to the first and second terminals, respectively, of capacitive load 102, which may comprise an electroluminescent lamp, for example. A first switch SW1 is connected between input rail $V_{HV}$ and the first output terminal $V_A$. Control signal C1 turns on switch SW1, thus connecting output terminal $V_A$ to input supply rail $V_{HV}$. Similarly, a second switch SW2 is connected between input rail $V_{HV}$ and the second output terminal $V_B$. Control signal C2 turns on switch SW2, thus connecting output terminal $V_B$ to input supply rail $V_{HV}$. Switches SW1 and SW2 may be implemented through the use of any of a number of well known switching devices, such as MOSFET transistors, bipolar transistors, SCRs, etc. The series connection of a third switch SW3 and a first transistor current source Q2 is connected between the first output terminal $V_A$ and the DC reference 101. Control signal C3 turns on switch SW3, thereby allowing transistor current source Q2 to pull down on the first output terminal $V_A$ with a substantially constant current. Similarly, the series connection of a fourth switch SW4 and a second transistor current source Q3 is connected between the second output terminal $V_B$ and the DC reference 101. Control signal C4 turns on switch SW4, thereby allowing transistor current source Q3 to pull down on the second output terminal $V_B$ with a substantially constant current. Implementation of transistor current sources Q2 and Q3 can be accomplished through the use of many well known devices, such as MOSFET transistors and bipolar transistors. Current reference 802 together with transistor Q1 appropriately biases current sources Q2 and Q3. A multitude of alternative techniques exist for appropriately setting the bias of transistor current sources Q2 and Q3. A pair of rectifying diodes D2 and D3 are connected in parallel with transistor current sources Q2 and Q3, respectively. Rectifying diode D2 serves to provide a low impedance connection to DC reference 101 when the output of current source transistor Q2 should be pulled to a potential below DC reference 101. Similarly, rectifying diode D3 serves to provide a low impedance connection to DC reference 101 when the output of current source transistor Q3 should be pulled to a voltage below DC reference 101. In an implementation utilizing an integrated circuit, diodes D2 and D3 may comprise the bulk diode associated with transistors Q2 and Q3. Furthermore, in a scenario in which current sources Q2 and Q3 are implemented using MOSFET transistors configured as current sources, the MOSFET transistors can further act as synchronous switches when the polarity of the voltage present on the output of the current sources is driven to a voltage less than that of DC reference 101.

Switch control and driver circuit 203 periodically issues output signals C1, C2, C3, and C4. During a first state of operation, control signals C1 and C4 are issued to turn on switches SW1 and SW4, respectively. During the first state of operation, transistor current source Q3 serves to charge lamp 102 with a substantially constant current. At the termination of the first state of operation, a differential voltage $V_A$-$V_B$ that is substantially equal to the voltage supplied by the input voltage rail $V_{HV}$ will be applied to electroluminescent lamp 102. During a second state of operation, control signals C3 and C4 are issued to turn on switches SW3 and SW4, respectively. Also during the second state of operation, transistor current source Q2 serves to discharge electroluminescent lamp 102 with a substantially constant current. At the termination of the second state of operation, the differtial voltage $V_A$-$V_B$ across lamp 102 will be substantially equal to zero. During a third state of operation, control signals C2 and C3 are issued to turn on switches SW2 and SW3, respectively. During the third state of operation, transistor current source Q2 serves to charge electroluminescent lamp 102 with a substantially constant current. At the termination of the third state of operation, a differential voltage $V_B$-$V_A$ substantially equal to the voltage supplied by the input rail $V_{HV}$ will be applied to lamp 102. During a fourth state of operation, control signals C3 and C4 are issued to turn on switches SW3 and SW4, respectively. During the fourth state of operation, transistor current source Q3 serves to discharge electroluminescent lamp 102 with a substantially constant current. At the termination of the fourth state of operation, the differential voltage $V_B$-$V_A$ across lamp 102 will be substantially equal to zero. Switch control and driver circuit 203 periodically cycles through the aforementioned four states of operation in response to a clock signal generated either internally or externally. Additional care should be taken when transitioning between the four states of operatiion to avoid the commonly known "shoot through" or "cross conduction" phenomena mentioned hereinabove in connection with the other embodiments of the present invention.

Although the previously described switch control and driver circuit 203 can be implemented with no input signals, input signals IN1 and IN2 are utilized to eliminate the presence of a "flat spot" in the differential voltage across lamp 102. This "flat spot" occurs when the differential voltage $V_A$-$V_B$ remains approximately equal to zero for a substantial length of time during the second and fourth states of operation. Comparator 208 serves to monitor the voltage at the first output terminal $V_A$ through switch SW3, which will be on during the second state of operation. At the initiation of the second state of operation, the voltage at the output terminal $V_A$ is relatively high. Throughout the second state of operation, the voltage at the output terminal $V_A$ decreases at a fixed rate toward zero. When the voltage at the output terminal $V_A$ passes through a first reference voltage $V_{REF1}$ that is typically near zero, comparator 208 will assert signal IN1. In response to the assertion of signal IN1, switch control and driver circuit 203 will terminate the second state of operation and initiate the third state of operation. Comparator 209 serves to monitor the voltage at the second output terminal $V_B$ through switch SW4 which will be on during the fourth state of operation. At the initiation of the fourth state of operation, the voltage at output terminal $V_B$ is relatively high. Throughout the fourth state of operation, the voltage at the output terminal $V_B$ decreases at a fixed rate toward zero. When the voltage at the output terminal $V_B$ passes through a second reference voltage $V_{REF2}$, also typically near zero, comparator 209 will issue signal IN2. In response to signal IN2, switch control and driver circuit 203 will terminate the fourth state of operation and initiate the first state of operation. The specific implementation of switch control and driver circuit 203 is relatively simple to one skilled in the art.

Although the previous embodiments have been described utilizing a single supply polarity in which the DC input rail voltage $V_{HV}$ is greater than the DC reference, those skilled in the art will readily recognize that the polarity of the previously described embodiments may be reversed to utilize a supply voltage source that is of negative polarity with respect to the reference. Implementing such a polarity reversal simply involves the reversal of the aforementioned voltage sources, current sources, and rectifiers.

In each of the previously described embodiments of the present invention, a DC to AC switching circuit has been disclosed for driving a capacitive load comprising an electroluminescent lamp 102. It will be readily appreciated that other loads, such as piezoelectric transducers, which exhibit primarily capacitive loading characteristics, may also be employed.

Several embodiments have been described above for implementing an improved DC to AC switching circuit. The novel approach of this switching circuit demonstrates constant current delivery to a capacitive load while realizing substantial reductions in supply current. Although the present invention has been described with reference to specific embodiments, it will be appreciated that various modifications may be made within the scope of the invention.

I claim:

1. A switching circuit for a DC to AC inverter utilized for driving a substantially capacitive load, the switching circuit comprising:

first and second input terminals connected to a DC voltage and a DC reference, respectively;

first and second output terminals for connection to said capacitive load;

a control circuit exhibiting first, second, third, and fourth states of operation;

first switching means responsive to said control circuit for connecting said first input terminal to said first output terminal during said first state of operation;

second switching means responsive to said control circuit for connecting said first input terminal to said second output terminal during said third state of operation;

first current conduction means for connecting said first output terminal to said DC reference, said first current conduction means presenting an open circuit in which current flow therethrough is substantially zero during said first state of operation, said first current conduction means being operative for conducting a substantially constant current during said second state of operation while the voltage at said first output terminal is substantially greater than said DC reference, said constant current dropping to a relatively small value when the voltage at said first output terminal is substantially equal to said DC reference, said first current conduction means being further operative for conducting a substantially constant current from said first output terminal during said third state of operation while the voltage at said first output terminal is substantially greater than said DC reference, said constant current dropping to a relatively small value as the voltage at said first output terminal is substantially equal to said DC reference, said first current conduction means being further operative for maintaing the voltage at said first output terminal substantially equal to said DC reference during said fourth state of operation;

second current conduction means for connecting said second output terminal to said DC reference, said second current conduction means being operative for conducting a substantially constant current from said second output terminal during said first state of operation while the voltage at said second output terminal is substantially greater than said DC reference, said constant current dropping to a relatively small value when the voltage at said second output terminal is substantially equal to said DC reference, said second current conduction means being further operative for maintaining the voltage at said second output terminal substantially equal to said DC reference voltage during said second state of operation, said second current conduction means presenting an open circuit in which the current flow therethrough is substantially zero during said third state of operation, said second current conduction means being further operative for conducting a substantially constant current from said second output terminal during said fourth state of operation while the voltage at said second output terminal is substantially greater than said DC reference, said constant current dropping to a relatively small value when the voltage at said second output terminal is substantially equal to said DC reference.

2. A switching circuit as in claim 1 wherein said control circuit comprises clock generation means for sequentially initiating transitions between said first, second, third, and fourth states of operation.

3. A switching circuit as in claim 2 wherein said control circuit is responsive to a first control signal applied to a first control input thereof for initiating the transition from said second state of operation to said third state of operation.

4. A switching circuit as in claim 3 wherein said control circuit is further responsive to said first control signal for initiating the transition from said fourth state of operation to said first state of operation.

5. A switching circuit as in claim 3 wherein said control circuit is responsive to a second control signal applied to a second control input thereof for initiating the transition from said fourth state of operation to said first state of operation.

6. A switching circuit as in claim 4 further comprising a sense and compare circuit, said sense and compare circuit comprising:
first voltage sensing means for monitoring a differential voltage between said first output terminal and said second output terminal to generate a first sense voltage; and
first voltage comparison means for generating said first control signal in response to a comparison of said first sense voltage with a first voltage reference.

7. A switching circuit as in claim 4 further comprising a sense and compare circuit, said sense and compare circuit comprising:
first current sensing means for monitoring the current flowing through said capacitive load to generate a first sense voltage;
first voltage comparison means for generating said first control signal in response to a comparison of said first sense voltage with a first voltage reference.

8. A switching circuit as in claim 4 further comprising a sense and compare circuit, said sense and compare circuit comprising:
first current sensing means for monitoring the current flowing through said first current conduction means to generate a first sense voltage;
first voltage comparision means for generating said first control signal in response to a comparison of said first sense voltage with a first voltage reference.

9. A switching circuit as in claim 5 further comprising a sense and compare circuit, said sense and compare circuit comprising:
first voltage sensing means for monitoring the voltage at said first output terminal to generate a first sense voltage;
second voltage sensing means for monitoring the voltage at said second output terminal to generate a second sense voltage;
first voltage comparison means for generating said first control signal in response to a comparison of said first sense voltage with a first voltage reference;
second voltage comparison means for generating said second control signal in response to a comparion of said second sense voltage with a second voltage reference.

10. A switching circuit as in claim 5 further comprising a sense and compare circuit, said sense and compare circuit comprising:
first voltage sensing means for monitoring the voltage at said first output terminal to generate a first sense voltage;
second voltage sensing means for monitoring the voltage at said second output terminal to generate a second sense voltage;
first voltage comparison means for generating said second control signal in response to a comparison of said first sense voltage with a first voltage reference;
second voltage comparison means for generating said first control signal in response to a comparion of said second sense voltage with a second voltage reference.

11. A switching circuit as in claim 5 further comprising a sense and compare circuit, said sense and compare circuit comprising:
first voltage sensing means for monitoring a differential voltage between said first output terminal and said second output terminal to generate a first sense voltage;
first voltage comparison means for generating said first control signal in response to a comparison of said first sense voltage with a first voltage reference; and
second voltage comparison means for generating said second control signal in response to a comparison of said first sense voltage with a second voltage reference.

12. A switching circuit as in claim 5 further comprising a sense and compare circuit, said sense and compare circuit comprising:
first current sensing means for monitoring the current flowing through said first current conduction means to generate a first sense voltage;
second current sensing means for monitoring the current flowing through said second current conduction means to generate a second sense voltage;
first voltage comparison means for generating said first control signal in response to a comparison of said first sense voltage with a first voltage reference; and
second voltage comparison means for generating said second control signal in response to a comparison of said second sense voltage with a second voltage reference.

13. A switching circuit as in claim 5 further comprising a sense and compare circuit, said sense and compare circuit comprising:
first current sensing means for monitoring the current flowing through said first current conduction means to generate a first sense voltage;
second current sensing means for monitoring the current flowing through said second current conduction means to generate a second sense voltage;
first voltage comparison means for generating said second control signal in response to a comparison of said first sense voltage with a first voltage reference; and
second voltage comparison means for generating said first control signal in response to a comparison of said second sense voltage with a second voltage reference.

14. A switching circuit as in claim 5 further comprising a sense and compare circuit, said sense and compare circuit comprising:

first current sensing means for monitoring the current flowing through said capacitive load to generate a first sense voltage;

first voltage comparison means for generating said first control signal in response to a comparison of said first sense voltage with a first voltage reference;

second voltage comprison means for generating said second control signal in response to a comparison of said first sense voltage with a second voltage reference.

15. A switching circuit for a DC to AC inverter utilized for driving an electroluminescent lamp, the switching circuit comprising:

first and second input terminals connected to a DC voltage and a DC reference, respectively;

first and second output terminals for connection to said electroluminescent lamp;

a first switch for connecting said first input terminal to said first output terminal in response to a first control signal;

a second switch for connecting said first input terminal to said second output terminal in response to a second control signal;

first and second current sources each having first and second terminals, the second terminals thereof being connected to said DC reference;

a third switch for connecting said first output terminal to said first terminal of said first current source in response to a third control signal;

a fourth switch for connecting said second output terminal to said first terminal of said second current source in response to a fourth control signal;

a first rectifier connected in parallel with said first current source and oriented such that said first current source biases said first rectifier when said third switch is open;

a second rectifier connected in parallel with said second current source and oriented such that said second current source biases said second rectifier when said fourth switch is open;

a control circuit for generating said first, second, third, and fourth control signals, said control circuit being operative for issuing said first and fourth control signals during a first state of operation, for issuing said third and fourth control signals during a second state of operation, for issuing said second and third control signals during a third state of operation, and for issuing said third and fourth control signals during a fourth state of operation.

16. A switching circuit as in claim 15 wherein said control circuit comprises clock generation means for sequentially initiating transitions between said first, second, third, and fourth states of operation.

17. A switching circuit as in claim 16 further comprising a first comparator for comparing a voltage at said first terminal of said first current source with a first voltage reference and for issuing a first signal; said control circuit initiating a transition from said second state of operation to said third state of operation in response to said first signal.

18. A switching circuit as in claim 17 further comprising a second comparator for comparing a voltage at said first terminal of said second current source with a second voltage reference and for issuing a second signal; said control circuit initiating a transition from said fourth state of operation to said first state of operation in response to said second signal.

19. A switching circuit as in claim 18 wherein said first and second current sources comprise MOSFET transistors configured as current sources, drain and source terminals of said MOSFET transistors serving as said first and second terminals, respectively, of said first and second current sources.

20. A switching circuit as in claim 19 wherein said first, second, third, and fourth switches comprise MOSFET transistors.

21. A switching circuit as in claim 19 wherein said first and second rectifiers each comprise a bulk diode of each of said MOSFET transistors.

22. A switching circuit as in claim 21 wherein said DC voltage is generated by a DC-DC converter operative for stepping up a low DC input voltage to said DC voltage.

* * * * *